F. W. MERRICK.
MACHINE FOR FINISHING AND BEADING THE EDGES OF STAY STRIPS AND THE LIKE.
APPLICATION FILED APR. 11, 1917.

1,293,157. Patented Feb. 4, 1919.
5 SHEETS—SHEET 1.

Fig. 1.

Witness.
Oscar F. Hill

Inventor
Frank W. Merrick
by Chas. F. Randall
Attorney.

F. W. MERRICK.
MACHINE FOR FINISHING AND BEADING THE EDGES OF STAY STRIPS AND THE LIKE.
APPLICATION FILED APR. 11, 1917.

1,293,157.

Patented Feb. 4, 1919.
5 SHEETS—SHEET 2.

Witness.
Oscar F. Hill

Inventor
Frank W. Merrick
by Chas. F. Randall
Attorney

F. W. MERRICK.
MACHINE FOR FINISHING AND BEADING THE EDGES OF STAY STRIPS AND THE LIKE.
APPLICATION FILED APR. 11, 1917.

1,293,157.

Patented Feb. 4, 1919.

Witness.
Oscar F. Hill

Inventor.
Frank W. Merrick
by Chas. F. Randall
Attorney

F. W. MERRICK.
MACHINE FOR FINISHING AND BEADING THE EDGES OF STAY STRIPS AND THE LIKE.
APPLICATION FILED APR. 11, 1917.

1,293,157.

Patented Feb. 4, 1919.
5 SHEETS—SHEET 5.

Witness:
Oscar F. Hill

Inventor:
Frank W. Merrick
by Chas. F. Randall
Attorney.

UNITED STATES PATENT OFFICE.

FRANK W. MERRICK, OF BOSTON, MASSACHUSETTS.

MACHINE FOR FINISHING AND BEADING THE EDGES OF STAY-STRIPS AND THE LIKE.

1,293,157.  Specification of Letters Patent.  Patented Feb. 4, 1919.

Application filed April 11, 1917. Serial No. 161,383.

*To all whom it may concern:*

Be it known that I, FRANK W. MERRICK, a citizen of the United States, residing at Boston, in the county of Suffolk, State of Massachusetts, have invented a certain new and useful Improvement in Machines for Finishing and Beading the Edges of Stay-Strips and the like, of which the following is a specification, reference being had thereto in the accompanying drawings.

The improvements in machines for finishing and beading the edges of stay-strips and the like are applicable, for instance, in the treatment of strips of leather designed for employment as edge finishing or stay-strips for use in the manufacture of shoes and other leather goods. They are further applicable for edge finishing strips of leather and other material used for other purposes.

A machine embodying the features of the present invention comprises edge-dressing devices for applying a tempering or finishing liquid or solution to the marginal portions of a stay-strip or the like, devices for beading or otherwise molding the edges of the said strip, and automatic devices for properly correlating the speeds of the strip-feeding elements of the two sets of devices so that between the two sets of devices the strip shall be maintained in the proper degree of tension and neither in excess nor so tightly strained as to unduly stretch the same or endanger breakage. In conjunction with the devices already named the machine includes provisions for drying and conditioning the strip after leaving the edge-dressing devices and before arriving at the beading devices. In the operation of the machine, the edge-dressing devices apply the liquid or solution to the margins of the strip. Between the two sets of devices the edges are permitted to dry to the required extent, and are appropriately conditioned. By the beading devices the edges of the strip are beaded or otherwise molded.

An embodiment of the invention is shown in the drawings, in which latter—

Figure 1:
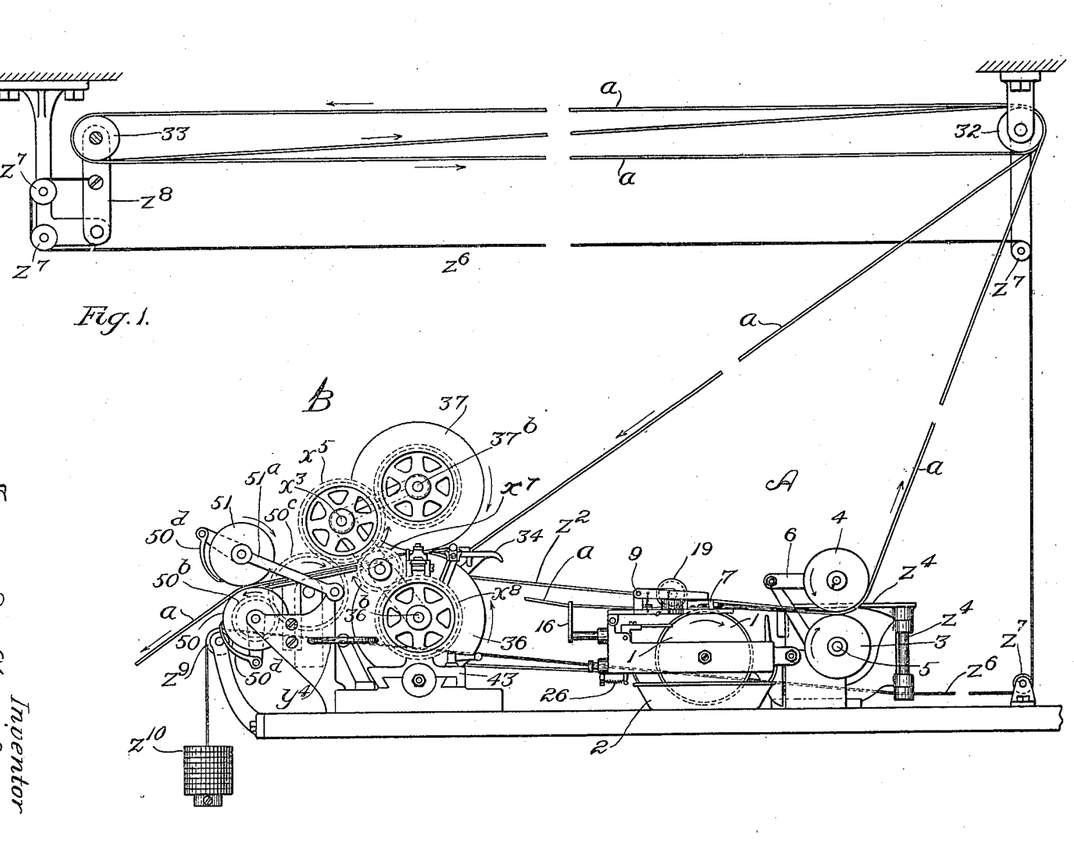
Figure 1 represents in side elevation an organized machine comprising the said embodiment.
Figures 2, 9:
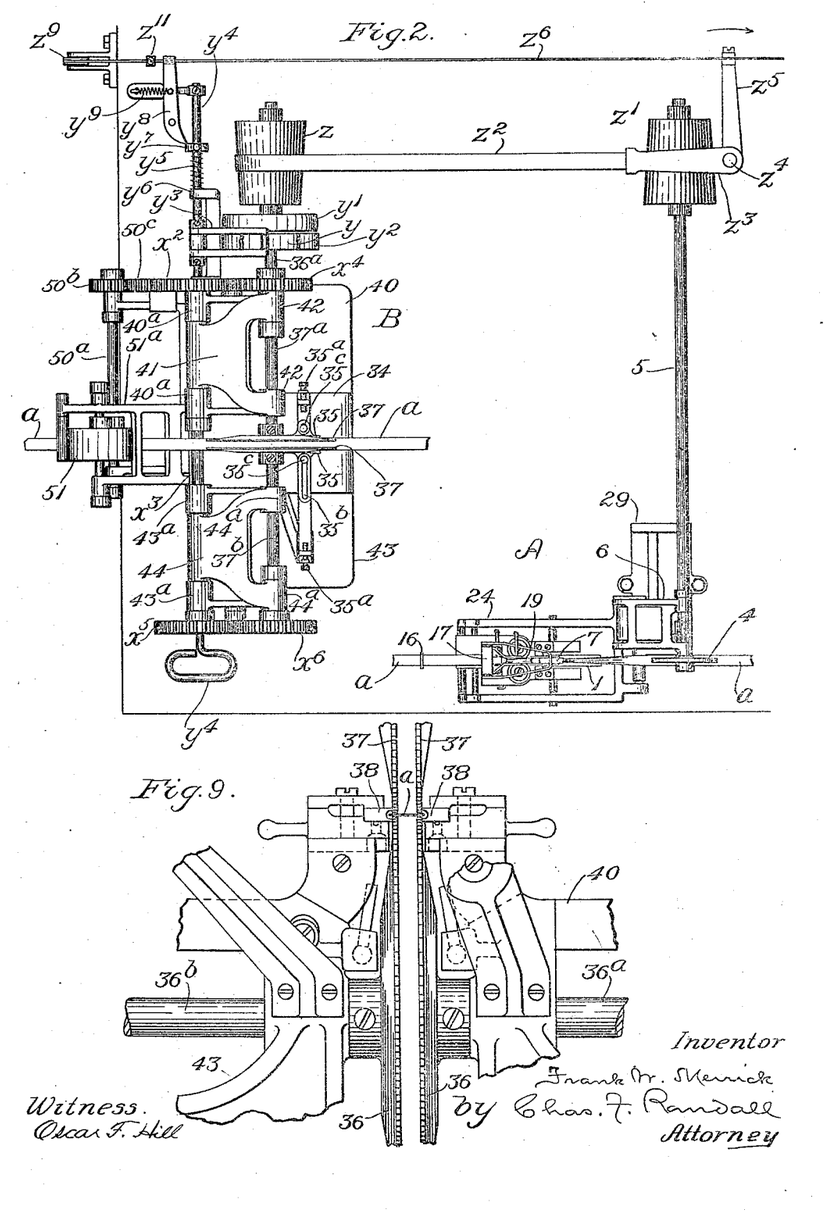
Fig. 2 is a plan view of the edge-dressing devices, the beading devices, and driving arrangements in connection with the said two sets of devices, on a scale larger than that of Fig. 1.
Fig. 9 is an elevation, on enlarged scale, of certain of the parts of the beading devices.

The edge-dressing devices collectively are shown at A, in Figs. 1 and 2, and the beading devices collectively are shown at B in such views.

A special aim in connection with the edge-dressing devices is to provide for the application of dressing material to the edges of a stay-strip or the like, and in addition usually to the marginal portions of the back of the strip, without any liability to getting such material upon the face of the strip. This aim is attained by providing means for bending a traveling strip upon itself transversely into U-shape and presenting the approximated edges to the means for applying the dressing material. The said means for applying the dressing material may vary according to circumstances, but preferably a moving conveyer is employed, to the surface of which the said edges are presented. The said moving conveyer usually is a wallower-roll which dips into a supply of dressing liquid or solution. Other aims and features of the invention are set forth later herein.

Figure 6:
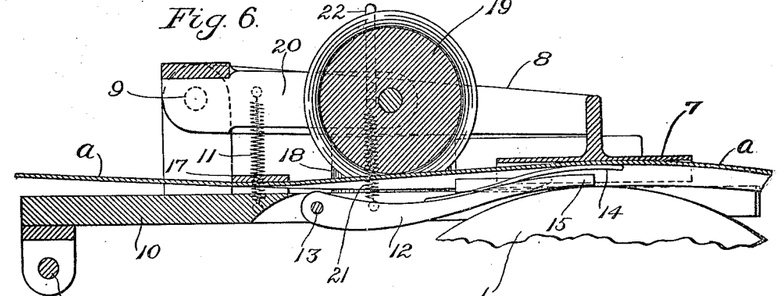
Fig. 6 is a view in vertical section, on a still larger scale, of certain of the parts of the edge-dressing devices.
Figure 7:
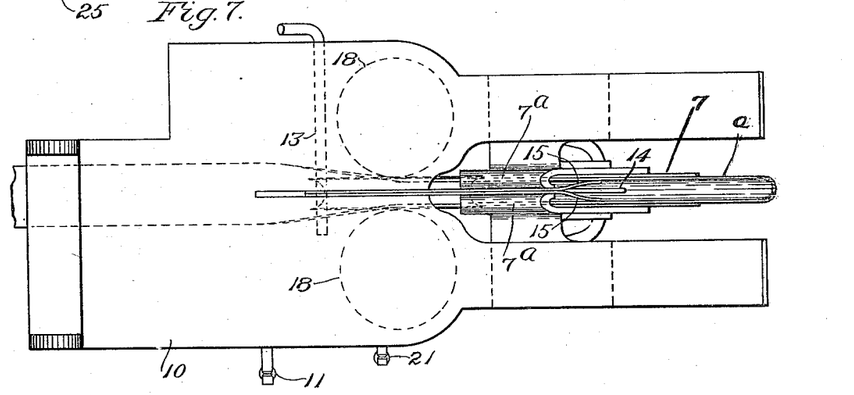
Fig. 7 is an inverted or bottom view of the parts which are shown in Fig. 6, omitting the wallower-roll or conveyer.
Figure 8:
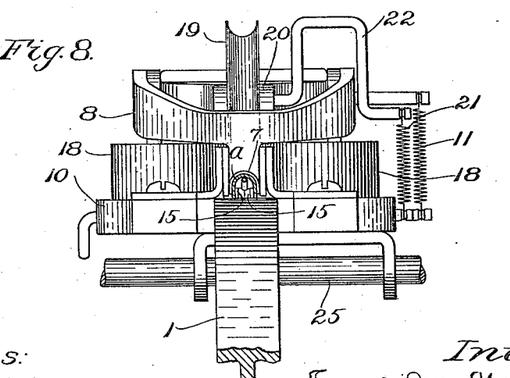
Fig. 8 is a view in elevation looking from the right-hand side in Fig. 6.

The edge-dressing devices of the illustrated machine are arranged to apply a liquid solution or preparation. They include a moving conveyer constituted by a wallower-roll 1 dipping into a pan or trough 2 containing the liquid or solution which is to be applied to the edges of the strip $a$ that is operated upon. This wallower-roll is conveniently mounted with capacity to rotate. It is arranged in this instance to be rotated through engagement of the traveling strip $a$ with its periphery. Suitable provisions are made for causing the strip to travel past the said wallower-roll. Herein, such travel of the strip is caused by means of a pair of feed-rolls 3 and 4. The said feed-rolls comprise a lower roll 3 that is mounted upon a supporting and actuating shaft 5 to which rotary motion is communicated, as explained later herein, and a presser-roll 4 that is carried by a swing-frame 6 and which presses with yielding force, in this case due to gravity although spring-tension may be utilized, upon the strip passing between the two rolls. The edge-dressing devices include also suitable means, as aforesaid for bending the strip $a$ transversely into U-shape as indicated best in Figs. 6, 7 and 8, and presenting its edges only, in position to make contact with the surface of the conveyer; that is to say, in this instance with the periphery of the wallower-roll. The illustrated machine includes as an element of the edge-dressing devices a guide 7 which is appropriately shaped to effect the desired bending and present the strip-edges to the said periphery, namely formed to provide a U-shape passageway for the strip, with the concavity of such passageway presented next the periphery of the wallower-roll. The said guide 7 is mounted movably, and tends with yielding pressure, which may be due to gravity but in this instance is due to spring-tension, toward the wallower-roll so as to bring the edges of the U-shaped strip into contact with the periphery of the wallower-roll. In the construction herein shown the guide 7 is carried by a swing-frame 8 which is pivoted at 9 to upstanding portions of the support 10 therefor, and has connected with it a contracting spiral-spring 11, by the tension of which spring the guide is drawn downward toward the top of the periphery of the wallower-roll 1 so that, as already indicated, the edges of the transversely bent strip $a$ shall be held in contact with the periphery of the wallower-roll 1, as shown clearly in Figs. 6 and 8, and thereby presented with yielding pressure to the means for supplying dressing-material. In order to cause the strip to conform to the internal shape of the guide 7, an expander or conformer is arranged to work within the concavity of the guide, and is contrived so as to bend the strip to conform to the transverse shape of the guide and hold it in contact with the guiding surface of the latter. In this instance the expander or conformer is in the form of an arm 12 pivoted at 13 in connection with the support 10, with its free end extended into the concavity of the guide 7 between the latter and the periphery of the wallower-roll 1. The said free end carries a wire 14 which operates to raise the middle of the width of the strip $a$ into contact with the middle of the width of the concavity of the guide 7, thereby insuring the bending of the strip into U-shape. The said end is furnished with laterally diverging fingers 15, 15, which operate between the down-turned side-margins of the bent strip to hold the said side-margins pressed outward against the opposite sides of the guide 7.

A special feature of the invention is the employment of wiper-means by which dressing-material is wiped transversely of the surface of the moving wallower-roll or other form of conveyer and applied marginally to a flat face of the strip alongside one or both of the edges of the strip. The lateral fingers 15, 15, are utilized as the said means in the present construction of the devices. To this end the said lateral fingers are caused to rest upon the periphery of the wallower-roll 1. They act after the manner of scrapers or wipers to displace laterally the liquid or solution that is carried by the portion of the said periphery with which they make contact, shifting it outward toward the margins of the strip $a$. By their pressure against the inner surfaces of said margins they insure that by capillary attraction a proper quantity of the liquid or solution shall be taken up by such margins.

To promote the bending of the strip $a$ into U-shape by the action of the guide 7 I preferably employ means arranged to act upon the strip before it reaches the guide 7, with the effect of starting the bend. Thus, the strip $a$ on its way to the edge-dressing devices passes through a leading-in guide 16, then under a hold-down bar 17, and then between side-guides 18, 18, the acting portions of which are closer together than the normal width of the strip, so that as the strip passes between the two guides 18, 18, edge-portions of the strip are pressed nearer together, which has a tendency to cause the strip to bulge, the direction of the bulge being upward, as determined by the action of the guide 7 and the co-acting expander or conformer. The guides 18, 18, may be constituted by rolls which are conveniently mounted upon the support 10, and are shown as thus constituted. The shape of the bend, as preliminarily produced by the action of the side-guides 18, 18, in forcing the edges of the strip closer together is more or less controlled and determined by the concave periphery of a presser-roll 19 which is disposed above the path of the strip $a$, it being mounted upon a movable support constituted by a swing-frame 20 that is hung upon the same pivotal axis 9 as the swing-frame 8, and acted upon by the tension of a contracting spiral-spring 21 which is engaged with a bent arm 22 projecting outward from the swing-frame 20 and arching over a side-portion of the swing-frame 8 carrying the guide 7. Vertical support is afforded the downturned lateral portions of the strip adjacent the roll 19 by means of flanges or lips $7^a$, $7^a$, projecting laterally inward from the opposite side-portions of guide 7, and upon which the edges of the strip rest.

Figure 3:
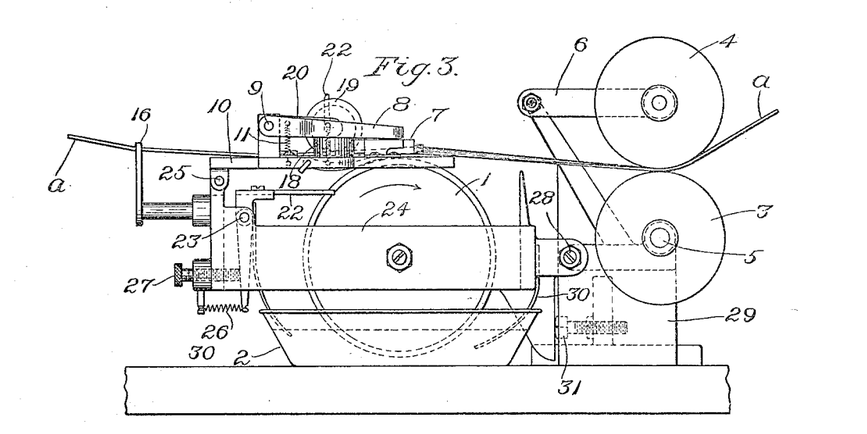
Fig. 3 shows the edge-dressing devices in side elevation on a scale larger than that of Fig. 2.
Figures 4, 5:
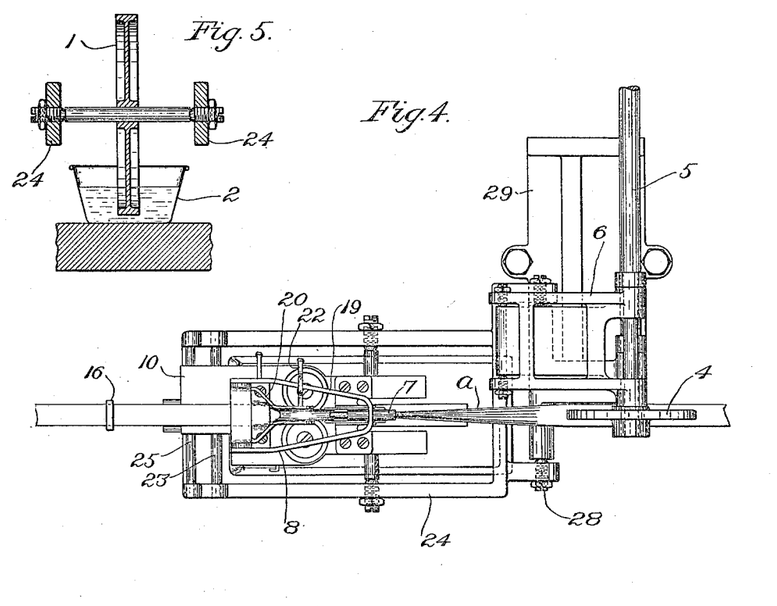
Fig. 4 is a plan view of the edge-dressing devices on the same scale as Fig. 3.
Fig. 5 is a view in vertical section of the conveyer or wallower-roll and its support, the pan or trough which contains the edge-dressing liquid or solution, and the support for the said pan or trough.

Excess of liquid or solution is removed from the periphery of the wallower-roll 1 before arrival at the edges of the strip $a$ by means of a doctor or stripper 22, Fig. 3, which is mounted pivotally at 23 upon the carrier 24 for the wallower-roll to which carrier the support 10 also is pivoted at 25, the said doctor or stripper having engaged therewith a contracting spiral spring 26 by means of which the doctor or stripper is actuated to carry its acting end toward the said periphery, the distance between the said acting end and such periphery being regulated by means of an adjusting screw 27 with which an arm of the doctor or stripper makes contact.

By reason of the hinge-mounting of the swing-frame 20 by which the roll 19 is supported, such roll may be raised from the strip $a$ when required. By reason of the hinge-mounting of the swing-frame 8, the guide 7 may be raised from the periphery of the wallower-roll. By reason of the hinge-mounting of the support 10, the guide 7 and associated parts may collectively be raised from the wallower-roll. The carrier 24 which serves as a mounting or support for the wallower-roll 1 and also for the other swing-frames to which reference has been made, itself is mounted pivotally at 28 upon a supporting stand 29, the hinge-mounting of the carrier 24 permitting it to be raised to lift the wallower-roll above the top of the pan or trough 2, together with the splash-guards 30, 30, which are carried by the carrier 24 and dip into the pan or trough at the front and rear of the wallower-roll. The normal position of the carrier 24 is determined and regulated by means of an adjusting screw 31, applied in connection with the stand 29, and against the head of which a downwardly-extending portion of the carrier 24 comes to rest when the carrier is lowered into its normal working position. By means of the said adjusting screw the depth to which the wallower-roll dips down into the pan or trough 2 may be regulated.

The feed-rolls 3, 4, are narrow and make contact with only the middle of the width of the strip on its way from the guide 7 and wallower-roll 1. They do not make contact with the moistened portions of the strip.

Referring now to the provisions for drying and conditioning the strip:—

After leaving the feed-rolls 3 and 4 the strip $a$ passes upward to one of the rolls or sheaves of a set of overhead rolls or sheaves 32, and from such roll or sheave passes to one of the rolls or sheaves of an opposite set 33 of rolls or sheaves, also overhead, and then passes back and forth over rolls or sheaves of the respective sets a suitable number of times to provide for the proper drying and conditioning of the strip, after which the strip proceeds on its way to the beading devices. The overhead sets of rolls 32, 33, are located at a considerable distance apart, usually about 15 or 20 feet.

Referring now to the beading devices:—

The beading devices comprise a supporting table 34 for the strip $a$, side guides 35, 35, for the edges of the strip, a lower pair 36, 36, of beading disks, an upper pair 37, 37, of beading disks, and edge-dies 38, 38, Fig. 9. The edge-guides 35, 35, have combined with them adjusting screws $35^a$, $35^a$, by means of which the said guides may be adjusted to locate their acting portions at the proper distance apart to suit the width of strip to be operated upon, and also in the proper relations with the beading disks. The stems or plate-portions of the said edge-guides are longitudinally slotted as at $35^b$, Fig. 2, to accommodate the stems of the clamping-screws $35^c$, $35^c$, by means of which the edge-guides are held from accidental loss of adjustment. Each beading disk is mounted upon its own shaft. The shaft $36^a$ of one of the lower beading disks 36 is mounted in bearings in connection with a stand 40, Fig. 9, at the top of which is pivotally mounted a swing-frame 41, Fig. 2, provided with bearings 42, 42, for the shaft $37^a$ of the corresponding upper beading disk 37. The other lower beading disk 36 is mounted upon a shaft $36^b$ which is mounted in bearings in connection with a stand 43, Fig. 9, at the top of which is pivotally hung a swing-frame 44 having bearings $44^a$, $44^a$, in which is mounted the shaft $37^b$ of the other upper beading disk 37. The beading disks are positively driven, the shaft $36^a$ being utilized as an actuating shaft, motion being transmitted from said shaft $36^a$ by means of a gear thereon and an idler or carrier that is journaled on stand 40 to a gear $x^2$ and its supporting shaft $x^3$, the said shaft $x^3$ being mounted in bearings at $40^a$, $40^a$, at the top of the stand 40 and also in bearings $43^a$, $43^a$, at the top of the stand 43. The two swing-frames 41 and 44 for the upper beading disks 37, 37, are hung upon this shaft $x^3$, and consequently the said disks and the said swing-frames swing concentrically with said shaft. The gear $x^2$ meshes with a gear $x^4$ fixed on the shaft $37^a$ of one of the upper beading disks 37. Thereby such beading disk is driven. Upon the other end of the shaft $x^3$ a gear $x^5$ is mounted, Figs. 1 and 2, the said gear $x^5$ meshing with a gear $x^6$ which is fast upon the shaft $37^b$ of the other upper beading disk 37. Thereby the latter upper beading disk is driven in unison with the beading disk 37 first referred to. From the beading disk 37 first referred to the shaft $36^b$ and remaining lower gear $x^5$ the shaft $36^b$ and remaining lower beading disk 36 are driven through the idle or carrier gear $x^7$ and the gear $x^8$ fast upon the said shaft $36^b$. Thus all four beading disks are rotated in unison.

The hinge-mounting of the upper beading disks in the swing-frames 41, 44, enables such beading disks to be raised out of the way when required to permit the strip $a$ to be introduced into place, and also enables them to rise and fall so as to accommodate themselves to the thickness of the strip passing between such disks and the lower ones, and to variations in the thickness of a strip in the length of the latter.

The edge-dies 38, 38, Fig. 9, are located alongside the outer faces of the two pairs of beading disks, their acting portions being disposed adjacent the nips of the upper and lower beading disks so that the edge-portions of the strip, projecting laterally beyond the beading disks, are received in the grooves of the said dies and undergo the action of the latter. One of the said edge-dies is mounted in connection with the stand 40; the other thereof is mounted in connection with the stand 43.

From the beading disks the strip $a$ passes to and between a pair of calender rolls 50, 51, by means of which the strip is fed out of the machine, in addition to being compressed and flattened somewhat following the beading operation. The lower calender roll 50 is mounted upon a shaft $50^a$ that is driven by means of gearing $50^b$ and $50^c$ from the gear $x^2$. The upper calender roll is mounted in a swing-frame $51^a$ and rests by gravity upon the strip $a$ passing between it and the lower calender roll 50. Strippers $50^d$, $50^d$, employed at the peripheries of the calender rolls prevent the strip from being wound around the latter.

Shaft $36^a$ is utilized as the drive-shaft of the organized machine, it being provided with fast and loose pulleys $y$, $y'$. The driving-band $y^2$ is controlled by means of a shifter-fork $y^3$ carried by a sliding rod $y^4$. An expanding spiral-spring surrounding this shaft and confined between a fixed stand $y^6$ and a collar $y^7$ fast on the rod acts with a tendency to move the rod and shifter in the direction to place the driving-band on the loose pulley $y'$ and keep it there, but by means of a pivoted catch $y^8$ actuated by means of a spring $y^9$ into engagement with the collar $y^7$ the belt-shifter device may be latched with the driving-band on the fast pulley $y$, after the said shifter-device has been moved so as to place the said band upon the latter pulley. Motion is transmitted from the shaft $36^a$ to the shaft 5 of the lower feed-roll of the edge-dressing devices by means of cone-pulleys $z$, $z'$, on the two shafts, and a connecting-belt $z^2$ as shown in Fig. 2. The position of the belt $z^2$ in the length of the cone-pulleys $z$, $z'$, is controlled by means of a cone-belt shifter $z^3$ carried by a rocker $z^4$ working on a vertical axis and having an arm $z^5$ thereof engaged with a band $z^6$ passing around guide-sheaves $z^7$, $z^7$, etc., and engaged by one end with a swing-arm $z^8$ carrying the set of rolls or sheaves 33. A portion of the band $z^6$ extending in the opposite direction from the arm $z^5$ of the rocker and passing over a roll or sheave $z^9$ has connected with it a weight $z^{10}$. This weight acts through the band with a tendency to turn the rocker $z^4$ so as to move the cone-belt $z^2$ toward the large end of the cone on feed-roll shaft 5, and also operates with a tendency to move the series of rolls or sheaves 33 away from the opposite series 32. When the tension of the various runs of strip $a$ passing back and forth between the two sets of rolls or sheaves 32, 33, increases, the set 33 will be drawn toward the set 32 and the movement transmitted from the supporting arm $z^8$ of said set 33 through the band $z^6$ to the rocker $z^4$ will have the effect of moving the said rocker so as to ship the cone-belt $z^2$ toward the small end of the cone $z'$, thereby speeding up the feed-rolls of the edge-dressing devices so as to increase the rate at which the strip is fed forward from such devices. When on the contrary the strip $a$ slackens between the two sets of rolls or sheaves 32, 33, so that the weight $z^{10}$ is permitted to act to pull the set of rolls or sheaves 33 away from the set 32, the resulting movement of the rocker $z^4$ will shift the cone-belt $z^2$ toward the large end of the cone $z'$ and thereby bring about a reduction in the speed of the feed-rolls 3, 4, of the edge-dressing devices, and thus reduce the rate at which the strip is fed forward from the latter devices. In this manner an equalizing action is maintained so that the strip shall continue at substantially uniform tension between the edge-dressing devices and the beading devices, with the rate of feed at the edge-dressing devices corresponding properly with that at the beading devices.

In order to stop the machine in case the strip between the two sets of devices should become so tight as to threaten breakage or be likely to unduly stretch the strip, a collar $z^{11}$ is provided upon the band $z^6$ adjacent the latch $y^8$ of the shipper devices. When the set of rolls or sheaves 33 has been drawn inward so far by the tightening of the strip $a$ between the two sets of rolls or sheaves 32, 33, that the said collar $z^{11}$ is caused to operate the catch $y^8$, so as to disengage it from the collar $y^7$ on the belt-shifter rod $y^4$, the spring $y^5$ will act to cause the driving belt $y^2$ to be shifted automatically from the fast driving pulley $y$ to the loose pulley $y'$ and the machine thereupon will come to rest.

Figure 10:
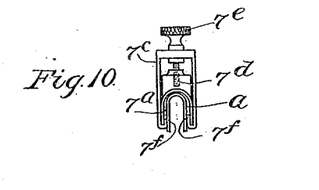
Fig. 10 shows in side elevation a manually adjustable guide which may be employed as an element of the edge-dressing devices.
Figure 11:
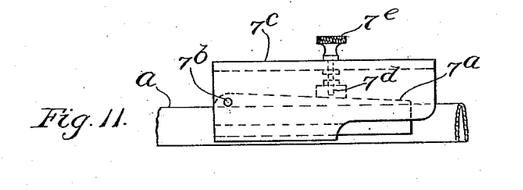
Fig. 11 is an end elevation of the adjustable guide of Fig. 10.
Figure 12:
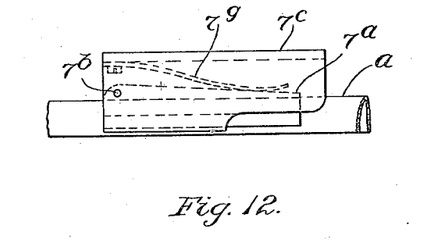
Fig. 12 shows in side elevation a self-adjusting guide which may be employed in the edge-dressing devices.

For the sake of clearness in the drawings I have shown therein in place in the machine a simple form of guide 7 of a non-adjustable character. The guide thus shown is not adapted to be used with strips varying much in width, and in case of a change from a strip of one width to one of a different width a guide of another size will have to be substituted for the one first in use. Figs. 10 and 11 show an adjustable guide which may be employed in connection with strips varying considerably in their respective widths, and which may be either manually adjustable or self-adjusting. The guide of the said views is a manually adjustable guide in which the concave guiding member $7^a$ is hinged at one end, as at $7^b$, to a carrier $7^c$. An adjusting screw $7^d$ is mounted in connection with the carrier $7^c$ and engaged with the guide-member $7^a$, so that upon taking hold of the milled head $7^e$ of the said screw and turning the screw the guide-member $7^a$ may be adjusted with reference to the periphery of the wallower-roll 1 to suit different widths of strip. The carrier-member $7^c$ is furnished with internal cheeks $7^f$, $7^f$, behind which the lower edges of the guide-member $7^a$ are sheathed so that the said cheeks protect the lower edges of the guide-member $7^a$ and at the same time serve as side-guides for the marginal portion of the strip that is being operated upon. Vertical adjustment of the guide-member $7^a$ relative to the cheeks $7^f$, $7^f$, varies the effective size of the guide-passage to suit the width of strip. If it is desired to render the guide-member $7^a$ automatically adjustable, a spring $7^g$ is combined with the said guide-member, as in Fig. 12, and the guide-member is left free to move toward and from the periphery of the wallower-roll to a certain extent, subject to the control of the spring. This spring normally keeps the guide-member pressed downward near the periphery of the wallower-roll 1. With an increase in the width of the strip the spring yields so as to permit the guide-member to assume a position to suit the width of strip in its doubled or U-shape.

What is claimed as the invention is:—

1. Edge-dressing devices for strip-material comprising, essentially, a conveyer for dressing material, and a device for bending a traveling strip into U-shape in cross-section and presenting the edges simultaneously to the said conveyer to receive the dressing-material therefrom.

2. Edge-dressing devices for strip-material comprising, essentially a rotating roll which carries dressing material upon its surface, and means for bending a traveling strip into U-shape in cross-section and presenting its edges to the said surface to receive the dressing-material therefrom.

3. Edge-dressing devices for strip-material comprising, essentially, means for bending a traveling strip into U-shape in cross-section, and means for supplying dressing-material to the approximated edges of the strip.

4. Edge-dressing devices for strip-material comprising, essentially, a moving conveyer for dressing-material, and a guide for bending a traveling strip into U-shape and presenting the edges thereof to the said conveyer as the strip travels past the latter.

5. Edge-dressing devices for strip-material comprising, essentially, a moving conveyer for dressing-material, and a guide for bending a traveling strip into U-shape and presenting the edges thereof to the said conveyer as the strip travels past the latter, said guide keeping said edges pressed with yielding force against the conveyer.

6. Edge-dressing devices for strip-material comprising, essentially, a moving conveyer for dressing-material, a guide for bending a traveling strip into U-shape and presenting the edges thereof to the said conveyer as the strip travels past the latter, and means for pressing said guide with yielding pressure toward the conveyer to keep the said edges in contact with the latter.

7. Edge-dressing devices for strip-material comprising, essentially, means for supplying dressing-material, and a movable guide which bends a traveling strip into U-shape and presents the edges thereof with yielding pressure to the said supplying means.

8. Edge-dressing devices for strip-material comprising, essentially, a moving conveyer for dressing-material, a roll with concave periphery which effects a preliminary bending of a traveling strip, and a guide through which said strip then passes in U- shape and by which its approximated edges are presented to the said moving conveyer to receive dressing-material.

9. Edge-dressing devices for strip-material comprising, essentially, a moving conveyer for dressing-material, means for producing a preliminary bending of a traveling strip, and a guide through which said strip passes in U-shape and by which its approximated edges are presented to the said moving conveyer to receive dressing-material.

10. Edge-dressing devices for strip-material comprising, essentially, means for supplying dressing-material, means for producing a preliminary bending of a traveling strip, and a guide through which said strip passes in U-shape and by which its approximated edges are presented to the said supplying means to receive dressing-material.

11. Edge-dressing devices for strip-material comprising, essentially, means for supplying dressing-material, side-guides for causing the edges of a traveling strip to approach each other, and a guide through which said strip passes in U-shape and by which its approximated edges are presented to the said supplying means to receive dressing-material.

12. Edge-dressing devices for strip-material comprising, essentially, a moving conveyer for dressing-material, side-guides for causing the edges of a traveling strip to approach each other, and a guide through which the strip then passes in U-shape and by which its approximated edges are presented to the said conveyer to receive dressing-material.

13. Edge-dressing devices for strip-material comprising, essentially, a moving conveyer for dressing-material, side-guides for causing the edges of a traveling strip to approach each other, a roll with concave periphery into which the strip enters, and a guide through which the strip then passes in U-shape and by which its approximated edges are presented to the said conveyer to receive dressing-material.

14. Edge-dressing devices for strip-material comprising, essentially, means for supplying dressing-material, side-guides for causing the edges of a traveling strip to approach each other, a roll with concave periphery into which the strip enters, and a guide through which the strip passes in U-shape and by which its approximated edges are presented to receive dressing-material.

15. Edge-dressing devices for strip-material comprising, essentially, means for supplying dressing-material, an internal guide through which the strip passes in U-shape and by which its approximated edges are presented to said supplying means to receive dressing-material, and expander-means by which the marginal portions of the strip are held flatly against opposite side-portions of the guide.

16. Edge-dressing devices for strip-material comprising, essentially, a moving conveyer for dressing-material, an internal guide through which the strip passes in U-shape and by which its approximated edges are presented to said conveyer to receive dressing-material, and expander-means by which the marginal portions of the strip are held flatly against opposite side-portions of the guide.

17. Edge-dressing devices for strip-material comprising, essentially, a rotating roll which carries dressing-material upon its surface, means for bending a traveling strip into U-form in cross-section and presenting its edges to the said surface to receive the dressing-material therefrom, and wiper-means by which dressing-material is wiped transversely of said surface and applied marginally to a flat face of the strip alongside one or both of the said edges.

18. Edge-dressing devices for strip-material comprising, essentially, a moving conveyer for dressing-material, an internal guide through which the strip passes in U-shape and by which its approximated edges are presented to said conveyer to receive dressing-material, and wiper-means by which dressing-material is wiped transversely of said conveyer and applied marginally to the inner face of the strip alongside one or both of the said edges.

19. Edge-dressing devices for strip-material comprising, essentially, a moving conveyer for dressing-material, guiding means by which a traveling strip is presented edgewise to the said conveyer to receive dressing-material upon its edge, and wiper-means by which dressing-material is wiped transversely of said conveyer and applied marginally to a face of the strip alongside such edge.

20. Stay-edge finishing mechanism comprising, in combination, edge-dressing devices, edge-beading devices operating upon a stay-strip on its way from the edge-dressing devices, and means controlled by the stay-strip for correlating the rate at which the strip travels through the edge-dressing devices and the rate at which it travels through the edge-beading devices with each other.

21. Stay-edge finishing mechanism comprising, in combination, edge-dressing devices, edge-beading devices operating upon the stay on its way from the edge-dressing devices, speed-varying means, and a take-up controlled by the tension of the stay-strip and controlling said speed-varying means to correlate the rate at which the strip travels through the edge-dressing devices and that at which it travels through the edge-beading devices with each other.

22. Stay-edge finishing mechanism comprising, in combination, edge-dressing devices, means for drying and conditioning the strip after having been treated by the said devices, and edge-beading devices operating upon the dried and conditioned strip.

23. Stay-edge finishing mechanism comprising, in combination, edge-dressing devices, oppositely disposed guiding means for the strip providing for extended back and forth travel of the strip under exposure to a drying atmosphere, and edge-beading devices operating upon the dried and conditioned strip.

In testimony whereof I affix my signature in presence of two witnesses.

FRANK W. MERRICK.

Witnesses:
CHAS. F. RANDALL,
ELLEN O. SPRING.

Copies of this patent may be obtained for five cents each, by addressing the "Commissioner of Patents, Washington, D. C."